United States Patent Office 3,222,149
Patented Dec. 7, 1965

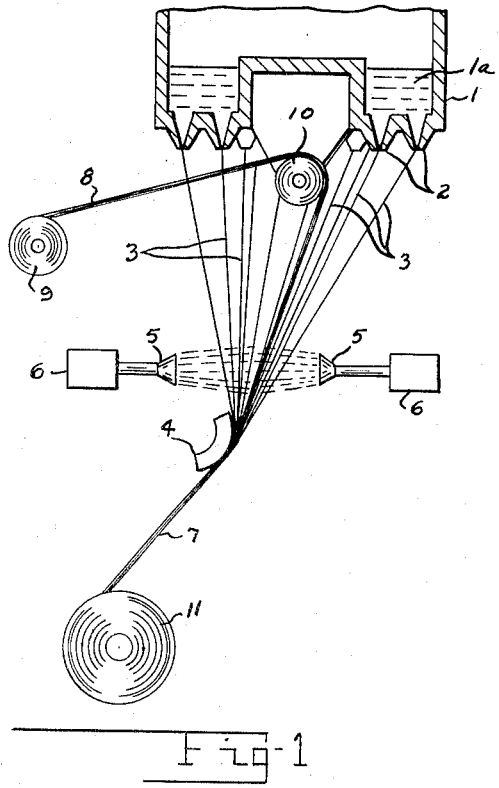
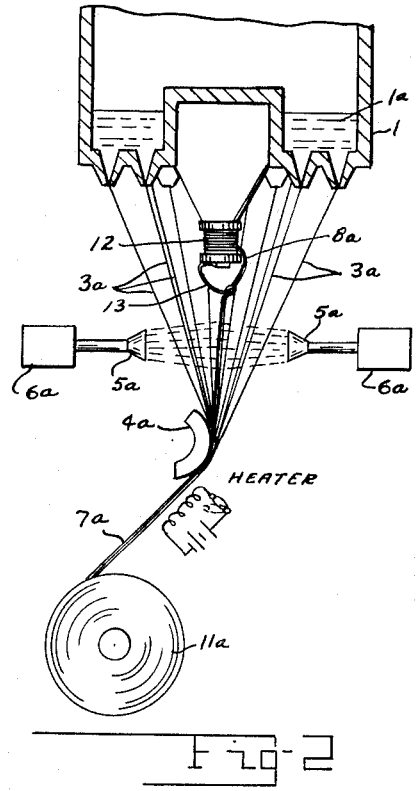
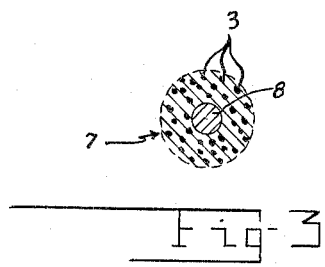
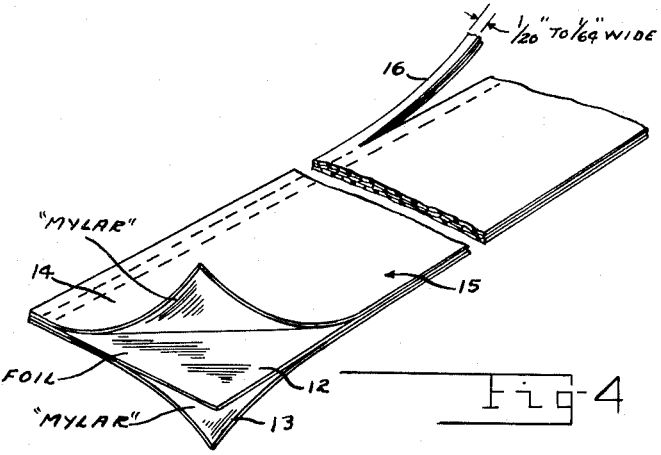
INVENTOR.
WARREN W. DRUMMOND

3,222,149
METHOD FOR PRODUCING CONDUCTIVE
GLASS FIBER YARN
Warren W. Drummond, Allison Park, Pa., assignor to the United States of America as represented by the Secretary of the Air Force
Filed Feb. 19, 1963, Ser. No. 260,101
1 Claim. (Cl. 65—3)

This invention relates in general to a new method and apparatus for producing an electro and heat-conductive glass fiber strand or yarn, and more particularly to a method and apparatus for uniting glass fibers to metal wire, or foil strips, in surrounding relation thereto to produce a yarn that has high tensile strength and is an excellent conductor of heat and electricity.

Some metal coated glass fiber yarns that have been previously manufactured have been poor conductors of electricity and heat due to the nonuniform and uneven metal coatings produced by various coating techniques. The breaks and nonuniformity inherent in such coatings destroy the conductivity of the glass fibers by providing air gaps and breaks in or within the coating.

The subject of this invention is a new method and apparatus for uniting metal and glass fibers without restorting to any of such coating techniques, so as to provide electrical and heat-conductive glass fiber strands or yarns of small diameters wherein a uniform and even surface of conductive metal is provided within each glass fiber strand. This, in effect, produces a glass fiber strand or yarn of small diameter that is an excellent conductor of heat and electricity and possesses a high tensile strength and flexibility.

An object of the invention, therefore, is the provision of a yarn comprising glass fibers and a metal core which is a good conductor of electricity and heat.

Another object is the method and apparatus for producing a heat and electricity conductive strand having a uniform even conductive metallic center or core enclosed and centered within a plurality of surrounding glass fibers.

A further object is the provision of means for producing a heat and electrically conductive strand of small diameter comprising a central electrically conductive metal wire or foil core having a group of fine glass fibers securely bonded thereto in surrounding and completely enclosing relation.

A further object is the provision of means for simultaneously feeding a small electroconductive metal wire of foil laminate strip into the center of a plurality or group of glass fibers and applying a binder adhesive to the fibers prior to their contact with the metal wire or strip, whereby the glass fibers are securely bonded to the wire or laminate strip in surrounding relation to form a glass fiber strand having a small flexible electroconductive metal core completely enclosed by the glass fibers.

A further object is the provision of a method for producing a uniform metallic surface within a strand of glass fibers to produce an electrical and heat-conductive material that has high tensile strength.

Other objects and advantages of the invention will become apparent from the following description and accompanying drawings in which like reference characters refer to like parts in the several figures.

FIG. 1 is a schematic vertical sectional view, parts thereof being shown in elevation for convenience, of one form or embodiment of the invention.

FIG. 2 is a similar view showing a slight modification thereof.

FIG. 3 is a schematic sectional view through an electrical and heat-conductive strand formed by the method and apparatus shown in FIG. 1.

FIG. 4 is a fragmentary perspective view on a greatly enlarged scale schematically illustrating one method of obtaining the "Mylar" metallic foil sandwich electroconductive strip employed in one form of the invention prior to spooling and feeding into the center of the surrounding glass fibers.

Referring more particularly to the embodiment of the invention shown in FIG. 1, a suitable glass "melter" receptacle is indicated at 1 being suitably heated to maintain the "melt" of glass 1a therein at a suitable temperature, and having a plurality of orifice tips 2 through which streams of molten glass flow, or are drawn to form a plurality or multitude of individual fine glass fibers or threads 3. The orifice tips 2 may be arranged annular, circular or rectangular in pattern on the glass melt container 1 as desired.

The glass fibers or threads 3 converge together as they are led or drawn, as a group, over a suitable gathering guide member 4 and combine to form a single strand or yarn 7, after which the strand 7 is wound on a suitable "drawing" storage reel 11.

A thin metallic electrically conductive core member wire 8 is supplied to the center of the group of glass fibers 3 after they leave the tips 2 and before the fibers 3 are gathered together on or by the gathering guide member 4.

The wire 8 may be made of any suitable electroconductive metals such as nickel, copper, aluminum, zinc, etc., and is supplied or drawn from a bobbin-spool or reel 9, and over a roller or pulley 10 which is located in the center of the glass fiber threads 3 adjacent the bottom of the glass melt receptacle 1.

Located above the guide member 4, adjacent the point of convergence of the glass fibers 3 around the conductive wire 3, are means for applying a suitable binder, adhesive or lubricant to the surfaces of the glass fiber threads 3 and the wire 8 as they are brought together by the guide member 4. The binder adhesive may be supplied to the fibers and wire by any suitable means, such as by means of spray nozzles or jets 5 connected to and supplied from suitable supply tank means, indicated at 6.

The adhesive or binder which is supplied at 5 for coating the wire and glass fibers as they are drawn over the confining guide means may be polyethylene terephthalate also commercially known as "Mylar," suitably heated and may be prepared with a suitable conventional primer, such as vinyl trichloro silane, B-chloro allyl alcohol.

The glass fibers and the metallic electrical conductor or wire 8 centered therein, as schematically illustrated in the greatly enlarged cross section in FIG. 3, are then wound on a storage spool 11 for future use and provide an electrical and heat-conductive strand or yarn material having great flexibility and high tensile strength. Suitable heating and drying means may be provided if necessary between the guide member 4 and the "take-up" and strand storage spool 11 to provide a maximum bond between the glass fibers 3 and the metallic core 8. In FIG. 1 the spool or bobbin 9 of the electroconductive wire 3 is located outside or in remote relation to the center of the glass melt receptacle 1 and is threaded through between the glass fiber threads 3 and over the pulley 10 which is suitably rotatably supported below the center of the melt receptacle 1 where it is simultaneously fed or drawn into the center of the converging fine glass fibers or threads 3 and over the forming guide 4, to form the glass fiber encased electro and heat-conductive strand or yarn 7.

In the embodiment shown in FIG. 2 the supply bobbin for the metal wire 8a is not located outside of the glass fiber threads 3a but the wire 8a is supplied from a suitable bobbin 12 which is located below the center of the receptacle and is rotatable on a vertical pivot, the wire 8a being suitably guided by a guide member 13 having a guide eye in the center of the group of the glass fibers or filaments 3a, as it is drawn toward the gathering guide member 4a.

An adhesive applying means, similar to that employed in FIG. 1 may be employed, as indicated at 5a and 6a for coating the wire 8a and surrounding glass filaments 3a prior to their convergence into the single strand 7a, as they pass across the guide member 4a, and are wound on to a receiving reel 11a, which is preferably power driven at a desired predetermined rate to maintain the desired drawing tension on the glass fibers, in a manner similar to that contemplated in FIG. 1.

It is also in accordance with this invention to provide a conductive glass fiber yarn employing a metal (electroconductive) foil strip completely enclosed and centered in a surrounding group of glass fibers or threads and fused or sealed therein. This process or method is performed (see FIG. 4) by first laminating a sheet of metal foil 12 between two sheets 13 and 14 of polyethylene terephthalate (sold commercially as "Mylar" by E. I. du Pont and Co.). The laminate 15 is then cut into a narrow long continuous strip which is then wound on a suitable reel or bobbin, such as the bobbin 9 (shown in FIG. 1) or the bobbin 12 (shown in FIG. 2).

The laminates 12, 13 and 14 may be prepared by treating the polyethylene terephthalate sheets with a conventional primer for polyethylene terephthalate sheets such as vinyl trichloro silane, B-chloro, allyl alcohol in the manner disclosed in U.S. Patent 2,785,085, then coating the treated polyethylene terephthalate with a conventional adhesive such as the epoxy resins, the acrylic resins and then adhering the coated polyethylene terephthalate sheets 13 and 14 to the conductive thin metal sheet or foil 12, of such material such as aluminum, nickel, copper, etc.

After the laminate 15 is formed it is cut into a continuous strip 16 having a width of about $\frac{1}{20}$ to $\frac{1}{64}$ of an inch and wound on the bobbin, such as 9 or 9a.

In making the glass fiber yarn or strand incorporating the "Mylar" sandwich just mentioned the strip 16 is fed or drawn from the bobbin 9 or 12 into the center of the group or multitude of glass fibers 3, as contemplated in connection with FIG. 1 or 2 and passed or is drawn over the collection guide 4a. However, the yarn or strand is heated to the fusion temperature of the "Mylar" which is approximately 350° F. At this temperature the polyethylene terphthalate fuses, causing the metal foil to adhere to the surrounding glass fiber 7a, thus producing the composite conductive fiber strand of the invention. This may be accomplished by heating the strand as it leaves the guide member 4 or 4a by a suitable heater means or heated roller to the fusion temperature of the polyethylene terephthalate before it is stored on the take-up or drawing and storing reel 10.

This provides a strongly tenacious union between the conductive metal strip and the glass fibers. In other words the heating to the fusion temperature just mentioned causes the glass fiber yarn to adhere tenaciously to the outside strips of the "Mylar" as well as causing the glass fiber enclosed "Mylar" strips to adhere firmly and uniformly to the intermediate metal foil strip.

It is also contemplated that the strand may be twisted after it leaves the forming guide member 4 or 4a. However, the twisting means is not shown, since any suitable twisting means may be employed, for instance the take-up spool 11 or 11a may, in addition to being driven to "draw" or take-up the strand, be rotated on an axis normal its rotative axis and the heating provided to dry and fuse the glass fiber to the wire or strip prior to the winding of the strand on to the spool or reel 11 or 11a.

Some end uses for the product formed by the method and apparatus incorporating the subject invention are:

(a) The production of fine conductive elements with an inorganic enclosing insulator;

(b) The production of heat-conductive glass fiber fabrics;

(c) The production of superior electrically conductive glass fiber fabrics;

(d) Improve heat-conductive reinforced glass fiber laminates;

(e) Electrically conductive, reinforced glass fiber laminates;

(f) High tensile strength chaff counter measure material.

I claim:

The method of making a flexible electrical heat-conductive glass fiber yarn which comprises forming a narrow sandwich strip of outer "Mylar" layers having an intermediate metallic electrically and heat-conductive foil of a width from $\frac{1}{20}$ to $\frac{1}{64}$ inch therebetween bonded thereto, simultaneously drawing an annular group of fine glass fibers from a glass melt with the "Mylar"-foil-"Mylar" sandwich strip centered therein to be completely surrounded by the glass fibers, converging the glass fibers into surrounding contacting relation with the "Mylar"-foil-"Mylar" sandwich strip, and applying heat having approximately 350° F. temperature to the contacting fibers and enclosed sandwich strip to fuse the "Mylar" surfaces of the strip to the surrounding glass fibers to cause the glass fibers to tenaciously adhere to the foil in encasing relation to form the flexible electrical and heat-conductive yarn aforesaid.

References Cited by the Examiner

UNITED STATES PATENTS

| 2,723,215 | 11/1955 | Biefeld et al. | 65—3 XR |
| 2,895,789 | 7/1959 | Russell | 65—3 |
| 2,939,761 | 6/1960 | Stein | 156—167 |

FOREIGN PATENTS

| 557,395 | 3/1958 | Canada. |
| 597,686 | 5/1960 | Canada. |

HOWARD R. CAINE, *Acting Primary Examiner.*

DONALL H. SYLVESTER, *Examiner.*